Patented Sept. 29, 1931

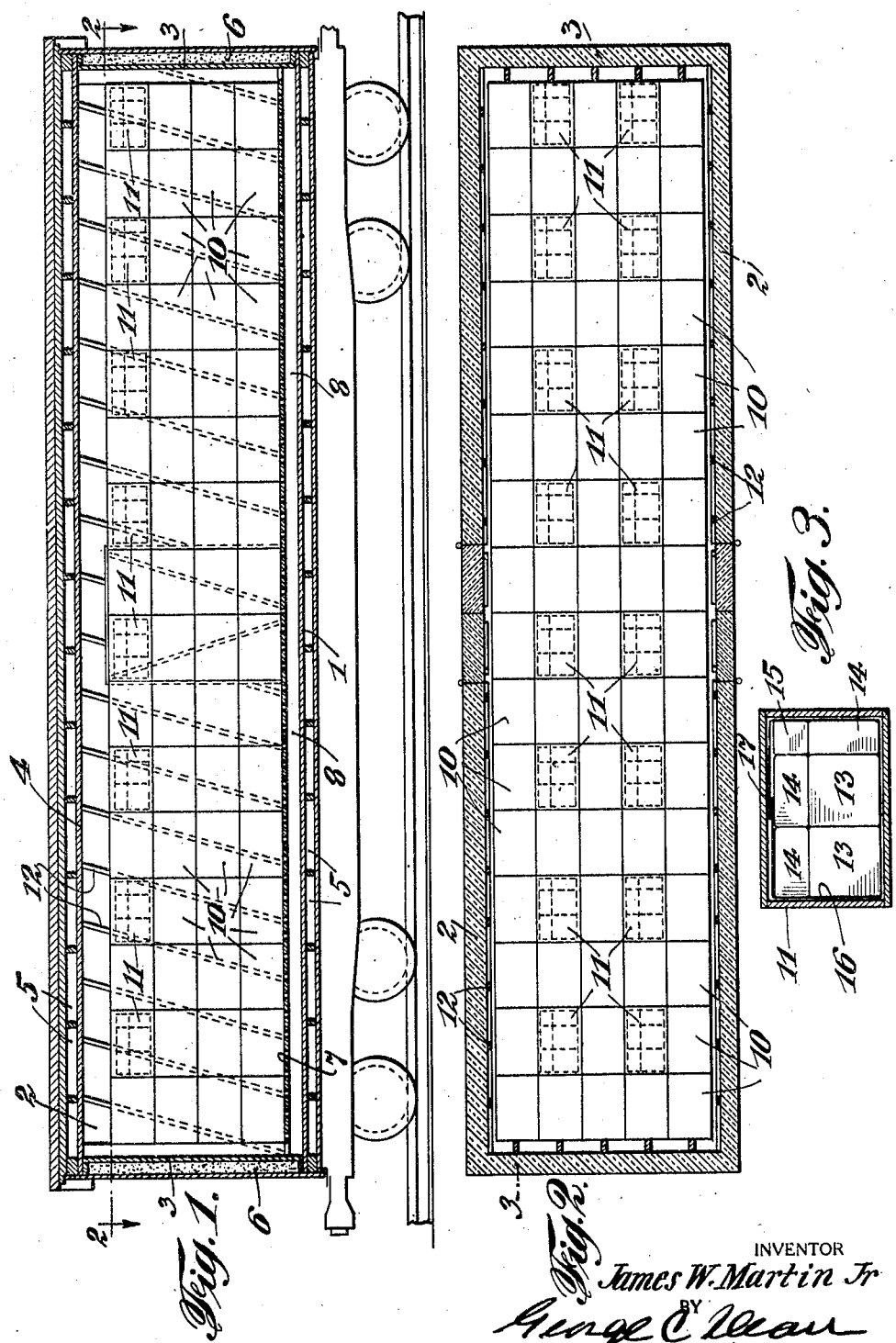

1,825,643

UNITED STATES PATENT OFFICE

JAMES W. MARTIN, JR., OF YONKERS, NEW YORK, ASSIGNOR, BY MESNE ASSIGNMENTS, TO DRYICE EQUIPMENT CORPORATION, OF NEW YORK, N. Y., A CORPORATION OF DELAWARE

REFRIGERATING APPARATUS AND METHOD

Application filed October 19, 1926, Serial No. 142,550. Renewed May 11, 1931.

My present invention relates to refrigeration of commodities or products which are not damaged by carbon dioxide gas, particularly previously frozen products and particularly those of the class which should be kept at temperatures substantially below the freezing point of water, as for instance frozen fish.

It contemplates the employment of intense refrigerants, preferably frozen carbon dioxide, according to principles which are in some respects similar to those set forth in Patent to Slate 1,595,426, but with modifications and improvements that are peculiarly applicable when the outer container is a large-capacity, one-side-up structure such as the refrigerator car or even the domestic refrigerator shown in Slate Patent 1,511,306. One point of similarity is enclosing within a refrigerator car or the like, a sufficient amount of the frozen carbon dioxide to maintain the required low temperature for long periods which may be from two or three days up to ten or fifteen days, or more.

From practical experience with such methods as applied to the transportation of carloads of frozen fish, I have discovered that commercial success depends upon utilizing the refrigerant medium in such a way as to minimize the waste of the frozen carbon dioxide that will result from using it to unnecessarily lower the temperature of the cargo while in transit. As the absorption of heat and over-freezing of the fish may continue down to a very low temperature, say, 70° F. below freezing, the refrigerant value that can be absorbed in this way in a carload of fish, is very large. On the other hand, the potential refrigerant value of a great mass of deeply over-frozen fish is of small value for emergency conditions, because fish flesh is a poor conductor of heat and a surface layer can become unduly warm while remote interior portions remain at very low temperature.

Where such unnecessary heat absorption is localized in certain parts of the cargo, refrigerant gas that flows therefrom to warmer parts of the cargo may not be cold enough to adequately refrigerate the said warmer parts. Consequently, the more the refrigerant gas is allowed to become warmed by unnecessarily refrigerating parts of the cargo, the greater will be the total amount of gas required to safely protect the more remote parts of the cargo. In the case of fish, the importance of maintaining all parts of the cargo safely below the critical temperature will be appreciated from consideration of the fact that if the temperature is maintained below that temperature, say, 25° F., there is practically no heat generated in the cargo and the amount of refrigerant required is only that necessary to balance exterior heat conducted to the interior of the car through the insulating walls thereof, but whenever the frozen fish in any part of the car get much above 28° F., they begin to oxidize or decompose, thereby generating heat within the car, and as this can only happen where the refrigating medium is already deficient, all thus generated heat will be effective for further raising the temperature and accelerating decomposition and heat generation.

For these and other reasons, my present invention contemplates certain modifications of the functioning where the methods of said Slate patents are applied to the above or other analogous situations. Such modifications I attain by arranging the solid carbon dioxide supply in a number of containers affording heat insulation of such extent as may be required by the nature of the cargo and which are distributed in or upon the upper part of the cargo; and by providing spaces for free upflow of warmer gas between the cargo and the side walls of the car as well as lateral or cross flow outwardly below the cargo and inwardly above the top of the cargo. This also ensures a highly insulating blanket of refrigerant carbon dioxide gas flowing in a closed circuit, with the upflow portion thereof entirely enveloping the cargo.

Preferably the cargo is pre-cooled to the desired temperature and in the case of fish or the like, is pre-frozen and preferably chilled below the freezing point. When in this condition, the products require no further expenditure of refrigerant for lowering their temperature, and they can be insulated from the refrigerant to any extent necessary to prevent undesirably low temperatures of the product, while in transit. Thus refrigerant is saved for the useful purpose of protecting the products from invasion by exterior heat. Pre-frozen fish can be sufficiently insulated by packing in paper lined wooden boxes of ordinary construction. Such boxes are preferably packed closely together within the car and may be stacked up to the roof if desired. Close packing of the boxes greatly impedes circulation of gas in the interior so that the limited supply of gas given off by the solid carbon dioxide, on or in the top of the mass is sufficient to ensure a slow leakage downward in the narrow cracks and spaces between the boxes, also some lateral spilling over the top and through the cracks causing down-flow over the exposed side faces of the boxes.

The solid carbon dioxide, being in the top layer, is directly accessible to heat from the roof, which is the hottest part of the car and this direct-acting, widely-variable source of heat will largely control the desired variations in the rate of evolution of refrigerant gas, said variations being only to a minor extent dependent on the relatively steady heat that reaches the refrigerant through the insulation offered by the refrigerated commodity.

The above arrangement, wherein the carbon dioxide is only partially surrounded and insulated by the material to be refrigerated and wherein the escaping gas has a free low resistance path of flow over the upper surface of the cargo, has great advantages for a refrigerator car or similar insulating container which always remains right-side-up. It is in marked contrast to the arrangement in said Slate Patent No. 1,595,436, wherein all of the heat for melting the refrigerant must find its way inward through the material to be refrigerated and all of the resultant frigid gas must flow outward through the same paths before it can reach the exterior layers. In so far as the patented arrangement permits any convection currents, the warmer, down current to the solid carbon dioxide must be through superposed layers of the product, whereas in my present arrangement the warm flow comes directly into contact with the refrigerant boxes and the only flow among the fish boxes is the cold gas from said refrigerant boxes.

A specific feature of my present arrangement is packing the carbon dioxide in cases of the same size and cheap wood construction used for packing the fish. In such a box and within a closed paper bag, preferably arranged mouth upward, the frozen carbon dioxide will have all the insulation that is necessary in the relations above described.

The above and other features of my invention will be more evident from the following description in connection with the accompanying drawings, in which Fig. 1 is a longitudinal vertical section showing more or less diagrammatically the conventional construction of a refrigerator car with the cargo packed therein in accordance with my present invention;

Fig. 2 is a horizontal section on the line 2—2, Fig. 1; and

Fig. 3 is a longitudinal section showing one of the refrigerant containing packing cases.

In Fig. 1 the refrigerator car is indicated as being of conventional construction, having a floor 1, side wall 2, end wall 3 and ceiling 4 of the usual double wall and interspace construction affording heat insulation, either by dead air space as indicated at 5, 5, or by cork, balsa wood or similar filling as indicated at 6. For purposes of my invention I prefer to provide the car with a slat floor 7, supported somewhat above the usual floor 1, on longitudinal timbers 8. Free circulation space is preserved adjacent the walls by suitable means such as diagonal battens 12 or by false walls like the floor 7.

The car is illustratively indicated as being practically filled with boxes 10, 11, closely stacked in four superposed layers, each layer being shown five boxes wide by sixteen boxes long. The boxes 10 may be supposed to contain fish which have been pre-frozen or over-frozen to a temperature substantially below 28° F., preferably 0° F. or lower. Preferably, the boxes 11 containing the supply of frozen carbon dioxide, are all in the top layer and distributed so that they are all separated by at least one fish box. By such arrangement, each refrigerant box, 11, has its bottom and all four sides surrounded by frozen fish boxes 10, while its top surface is directly exposed adjacent the roof where the temperature is highest and varies most widely in response to heat leaking into the car from the exterior.

The contiguous fish boxes in the upper layer all have their upper surfaces likewise exposed to the heat of the roof and the outside rows have their sides also exposed to the heat of the adjacent side of the car. Consequently, the heat units one wooden wall of a fish box can transfer to the solid carbon dioxide through its adjacent wall, as against the heat units said fish box will receive through the five other walls, tend to a balance and, if each box is relatively small, the box as a whole will not be over-frozen too much below the prevailing atmospheric temperature within the car. In the case illustrated, the boxes are supposed to be about 27 inches long by 18 inches wide by 18 inches deep. Consequently, though the fish and the papers in which they may be wrapped, and the wooden walls of the boxes containing them, are all poor conductors of heat, the maximum distance for heat conduction from one face of the box to the other, is only 18 inches, and as all the operations of gas evolution, conduction and convection are extremely slow, the slow rates of heat transfer within a box of fish are not so slow when considered in their relation to these other factors of the situation.

Another feature is that the two top layers, in the warmest part of the car, are the ones that have the fish boxes in closest heat transfer relation to the refrigerant boxes and the lower layers are submerged in the coldest part of the gas near the bottom of the car.

Wide variations in the geometrical arrangement of the refrigerant boxes is permissible provided the distribution is such as to insure the benefits of my present invention. One of the important improvements over all other methods with which I am familiar is substantially including the entire cargo of a car or similar large refrigerator chamber mainly within the downflow leg of natural thermo-circulation of gases given off from the frozen carbon dioxide. In this connection, a closely piled stack of pre-frozen product is preferabe, but is not absolutely essential, since a stack of unfrozen products may be similarly included in the downflow leg of a closed circuit of thermo circulating gas, provided the insulating boxes are sufficiently thick to afford heat insulation and thus moderate the rate of evolution of the gas. It does seem essen ial, however, to have a predominate supply of the frozen carbon dioxide properly distributed in or over the uppermost part of the cargo so that the downflow part of the circuit will have a strong tendency to include or embrace practically all of the cargo, while the upflow circuit will be mainly adjacent the heated walls. Preferably, also, the space adjacent said walls should be sufficient to permit spill-over and downflow of the cold gas adjacent the outer surfaces of refrigerated products simultaneously with the upflow adjacent the car wall. Also there should be free space under the cargo and above the cargo to permit cross-flow and equalization of thermo-circulation.

Distributed as above described, the refrigerant is more directly responsive to local conditions in the car. For instance, localized heating causing accelerated upflow in any part of the car will take effect directly on an adjacent refrigerant box and cause increased output of refrigerant gas, which will be thrown into the part of the circuit where it is needed, whereas in other systems with which I am familiar, local heating causes increased gas production indirectly, and only as it operates to raise the general temperature of the car atmosphere.

Fig. 3 shows how a fish box, say, 27 inches long by 18 inches high will appear when filled with refrigerant supplied in 10 inch cubes. There will be complete cubes, 13, 13, half cubes 14, 14, and a quarter cube, 15, the geometric arrangement appearing the same whether viewed in side elevation or in plan. The box lining, 16, is preferably a completely formed bag which may be of waterproof paper such as is commonly used for wrapping frozen fish for transportation. The open mouth of the bag may be folded over as at 17 and may be sealed if desired.

From the above, it will be understood that practise of my invention in a preferred case may be somewhat as follows:

Fresh fish will be frozen and cooled down to approximately zero by cheap refrigerating methods at the packing station. They will then be packed in the boxes. A desired number of similar boxes will then be packed with frozen carbon dioxide. The fish boxes will then be stacked in the car with the refrigerant boxes distributed preferably in or on the top layer of fish boxes. A few blocks of frozen carbon dioxide may be scattered over the top layer for quick evaporation to effect initial chilling of the car, for which purpose the car doors will be immediately closed and all cracks sealed.

For use under moderate cool weather conditions in the Spring and Fall, the total amount of refrigerant required will depend upon the length of time the car is to be on the road and in a typical case may vary from, say, 1200 pounds for two or three days up to, say, 2800 pounds for nine or ten days.

As before stated, wide variation in the sizes and distribution of the boxes is permissible and the required total amount of carbon dioxide may be concentrated in a fewer number of larger boxes, as, for instance, one box in each corner, with one or two at the center of the car or, at the limit, two boxes, one across the top of the load, one at each end of the car. It will be evident, however, that in the latter case the discharge of gas will not normally be distributed sufficiently to ensure the important feature of substantially embracing the cargo in the down leg of the thermo circulation, but it will be evident that the desired distribution of the gas over the top of the cargo may be had by means of conduits leading from the refrigerant boxes to desired points of discharge. For instance, in the case illustrated in the drawings, it would be a simple matter to use eight boxes of twice the size shown, each box discharging in the location now indicated for two of the refrigerant boxes or, where the four boxes are used, one in each corner, there would be four outlets at points corresponding to the illustrated location of four of the boxes, etc.

A cheap construction for this purpose would be large corrugated paper cartons, each having a capacity equal to that of four fish boxes. The cartons can be made practically gas tight against gravity flow of gas by the above described paper lining, and the entire box can be additionally sealed by ordinary pasters laid over the joints and seams of the box. In such case, the box would be pierced with holes for ordinary pasteboard tubes running over the cargo to the desired distribution points.

While the novelty of many of the specific features of my present invention will be obvious from the foregoing, it may be well to note with reference to some of the broader method claims hereinafter set forth, that these methods are to be distinguished from those set forth in application Ser. No. 169,170, wherein a very important feature is localizing the upflow of the gas in a separate passage, outside of the refrigerated space, and discharging all of the upflow gas therefrom, outside the refrigerated space so that said gas cannot return to mingle with the fresh gas; nor establish closed circuit thermo circulation therewith; whereas in the present case, return of the warm gas to mingle with fresh gas in a closed circuit of thermo circulation, is an important feature.

I claim:

1. The method of refrigeration which consists in enclosing within a chamber, with the material to be refrigerated, and adjacent the upper part thereof, a quantity of separated masses of carbon dioxide which has been previously frozen and is in solidified mass form, and which on absorption of heat through the insulation passes directly from a solid to a gas much heavier than air; and permitting all the gas to escape into said enclosing chamber, as formed, to substantially include all of said material in the path of such downflow, and providing for upflow of displaced air and warm gas between said material and the outer shell of the chamber, and permitting inflow thereof above said material so as to maintain a closed circuit of thermo circulation.

2. The method of refrigeration which consists in enclosing within a chamber, with a large number of units of the material to be refrigerated assembled and superposed so as to afford passages for downflow of gas among them, and, suitably distributed over the top of said superposed units, quantities of suitably insulated carbon dioxide which has been previously frozen and is in solidified mass form, and which on absorption of heat through the insulation passes directly from a solid to a gas much heavier than air; and permitting all the gas to escape into said enclosing chamber, as formed, to substantially include all of said material in the path of such downflow, and providing for upflow of displaced air and warm gas between said material and the outer shell of the chamber, and permitting inflow thereof above said material so as to maintain a closed circuit of thermo circulation.

3. The method of refrigeration which includes enclosing the material to be refrigerated in a number of relatively small, suitably insulating containers, stacking said containers within an insulating chamber and suitably distributing over the top of said containers, quantities of suitably insulated carbon dioxide which has been previously frozen and is in solidified mass form, and which on absorption of heat through the insulation passes directly from a solid to a gas much heavier than air; and permitting all the gas to escape into said enclosing chamber, as formed, and to flow downward in said enclosing chamber, displacing the air upward but maintaining a closed circuit of thermo-circulation, the down leg of which includes all of said containers of the material to be refrigerated and the up leg of which is localized in interspaces provided between the exterior shell of the insulating chamber and said stack of containers.

4. The method of refrigeration which includes superfreezing the material to be refrigerated, enclosing it in a multiplicity of suitably insulating containers, stacking said containers within an insulating chamber and suitably distributing adjacent the tops of said containers, a number of suitably insulated containers each containing frozen carbon dioxide which on absorption of heat through the insulation passes directly from a solid to a gas much heavier than air; and permitting the gas from all of said carbon dioxide containers to escape into said enclosing chamber, as formed, and to flow downward in said enclosing chamber, displacing the air and warmer gas upward, thereby maintaining a closed circuit of thermo-circulation, the down leg of which includes all of said containers of the material to be refrigerated and the upleg of which is localized in interspaces provided between the exterior shell of the insulating chamber and said stack of containers.

5. The method of refrigeration which includes superfreezing material to be refrigerated sufficiently below its freezing point to store up substantial refrigerant values to be developed in warming up to said freezing point, enclosing portions of said material in a multiplicity of similar insulating boxes and stacking said containers within a refrigerating chamber along with similar containers each having frozen carbon dioxide therein, the latter containers being distributed among the former.

6. The method of refrigeration which includes superfreezing material to be refrigerated, enclosing portions of said material in a multiplicity of similar insulating boxes and stacking said containers within a refrigerating chamber along with similar containers each having frozen carbon dioxide therein, a suitable number of the latter containers being distributed in the top layer of the stack, for the purpose described.

7. The method of refrigeration which includes superfreezing material to be refrigerated, enclosing portions of said material in a multipicity of similar insulating boxes and stacking said containers within a refrigerating chamber along with similar containers each having frozen carbon dioxide therein, all of said carbon dioxide containers being distributed in direct heat transfer relation to the topmost layer of said containers of the material to be refrigerated.

8. An insulating refrigerator structure, having stacked therein a multiplicity of parcels of perishable products with a number of separated insulating containers of frozen carbon dioxide, distributed at intervals adjacent and among the parcels of the top layer of the stack.

9. An insulating refrigerator structure having closely stacked therein a multiplicity of similar boxes of insulating material enclosing perishable products and similar separated boxes containing frozen carbon dioxide distributed in the upper layer of the boxes containing perishable products said boxes being distributed at sufficiently close intervals to embrace substantially all of the boxes in streams of gas down-flowing from said frozen carbon dioxide.

10. A refrigerator car for transporting fish having a ventilated cargo supporting floor permitting circulation beneath the cargo, means for maintaining circulation space between the cargo and the side walls of the car, said cargo space being stacked high with wooden boxes containing frozen fish but having distributed within the top layer of said fish boxes similar boxes containing carbon dioxide.

11. A refrigerator car having a ventilated cargo supporting floor permitting circulation beneath the cargo, means for maintaining circulation space between the cargo and the side walls of the car, said cargo space being stacked high with wooden boxes containing frozen fish but having distributed in the top layer of said fish boxes similar boxes containing carbon dioxide, the latter boxes being separated from one another by intervening boxes of fish.

12. A refrigerator car or the like, having stacked therein a quantity of perishable products with free spaces beneath, at the sides and above the stack, in combination with means for generating and inducing thermo-circulation of refrigerant carbon dioxide gas, the down leg of the circulation substantially embracing the stack and the up leg including the spaces about the sides of the same, said means including insulating containers of solid carbon dioxide distributed adjacent the level of the top of the stack, evaporating and discharging the refrigerant carbon dioxide gas responsively to variations in temperature at the level of the top of the stack and at points substantially distributed in and over the top of the cargo.

Signed at New York in the county of New York and State of New York, this 15th day of October, A. D. 1926.

JAMES W. MARTIN, Jr.